US009923779B2

(12) United States Patent
Berner et al.

(10) Patent No.: US 9,923,779 B2
(45) Date of Patent: Mar. 20, 2018

(54) CONFIGURATION OF A SOFTWARE DEFINED NETWORK

(71) Applicant: Schweitzer Engineering Laboratories, Inc., Pullman, WA (US)

(72) Inventors: Marc Ryan Berner, Monroe, WA (US); Rhett Smith, Kuna, ID (US); Jason A. Dearien, Moscow, ID (US); Josh Powers, Pullman, WA (US); Grant O. Boomer, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 51 days.

(21) Appl. No.: 14/803,786

(22) Filed: Jul. 20, 2015

(65) Prior Publication Data
US 2017/0026243 A1    Jan. 26, 2017

(51) Int. Cl.
*H04L 12/24* (2006.01)
*H04L 12/717* (2013.01)
(Continued)

(52) U.S. Cl.
CPC .......... *H04L 41/12* (2013.01); *H04L 41/0883* (2013.01); *H04L 45/42* (2013.01);
(Continued)

(58) Field of Classification Search
CPC ..... H04L 41/12; H04L 41/0886; H04L 45/02; H04L 47/2483
See application file for complete search history.

(56) References Cited

U.S. PATENT DOCUMENTS

| 6,747,957 | B1 | 6/2004 | Pithawala |
| 7,218,632 | B1 | 5/2007 | Bechtolsheim |

(Continued)

FOREIGN PATENT DOCUMENTS

| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.
(Continued)

*Primary Examiner* — Michael Thier
*Assistant Examiner* — Brian P Cox
(74) *Attorney, Agent, or Firm* — Jared L. Cherry (57) ABSTRACT

The present disclosure pertains to systems and method for configuration of communication flows in a software defined network ("SDN"). In one embodiment, a system is operable to configure a communication flow between a first host and a second host. A mode selection subsystem is configured to cause a plurality of network devices in a network connecting the first communication host and the second communication host to transition between an open mode and an SDN operating mode. In the open mode, the network devices may discover a communication path between the first host and the second host. An analysis subsystem may receive information from the plurality of network devices information about the discovered path, and a topology discovery subsystem may be configured to create a communication flow corresponding to the discovered path. The communication flow may allow communication between the first host and the second host in the SDN operating mode.

17 Claims, 5 Drawing Sheets

(51) Int. Cl.
 *H04L 12/751* (2013.01)
 *H04L 12/851* (2013.01)
(52) U.S. Cl.
 CPC .......... *H04L 45/02* (2013.01); *H04L 47/2483* (2013.01); *Y04S 40/162* (2013.01); *Y04S 40/164* (2013.01)

(56) References Cited

U.S. PATENT DOCUMENTS

| | | | |
|---|---|---|---|
| 7,376,831 | B2 | 5/2008 | Kollmyer |
| 7,872,983 | B2 | 1/2011 | Lai |
| 8,553,544 | B2 | 10/2013 | Lai |
| 8,800,044 | B2 | 8/2014 | Raad |
| 9,038,151 | B1 * | 5/2015 | Chua ............... H04L 45/02 709/223 |
| 9,237,129 | B2 | 1/2016 | Ling |
| 9,286,171 | B2 | 3/2016 | Cardona |
| 9,432,255 | B1 | 8/2016 | Hasan |
| 9,432,380 | B2 | 8/2016 | Margalit |
| 9,680,588 | B2 | 6/2017 | Connolly |
| 9,686,125 | B2 | 6/2017 | Smith |
| 9,769,060 | B2 | 9/2017 | Dearien |
| 2002/0172157 | A1 | 11/2002 | Rhodes |
| 2003/0112821 | A1 | 6/2003 | Cleveland |
| 2003/0125924 | A1 | 7/2003 | Lines |
| 2003/0133443 | A1 | 7/2003 | Klinker |
| 2003/0188159 | A1 | 10/2003 | Josset |
| 2005/0025141 | A1 | 2/2005 | Chao |
| 2005/0078672 | A1 | 4/2005 | Caliskan |
| 2005/0192008 | A1 | 9/2005 | Desai |
| 2008/0005558 | A1 | 1/2008 | Hadley |
| 2008/0080384 | A1 | 4/2008 | Atkins |
| 2009/0257743 | A1 | 10/2009 | Chung |
| 2009/0285093 | A1 | 11/2009 | Bolt |
| 2009/0313189 | A1 | 12/2009 | Sun |
| 2010/0241608 | A1 | 9/2010 | Huang |
| 2011/0085567 | A1 | 4/2011 | Beecroft |
| 2011/0087952 | A1 | 4/2011 | Marin |
| 2013/0077477 | A1 | 3/2013 | Daraiseh |
| 2013/0108259 | A1 | 5/2013 | Srinivas |
| 2013/0159865 | A1 | 6/2013 | Smith |
| 2013/0212285 | A1 | 8/2013 | Hoffmann |
| 2013/0250770 | A1 | 9/2013 | Zou |
| 2013/0263247 | A1 | 10/2013 | Jungck |
| 2013/0294228 | A1 | 11/2013 | Ahuja |
| 2014/0025945 | A1 | 1/2014 | McGrew |
| 2014/0029451 | A1 | 1/2014 | Nguyen |
| 2014/0064100 | A1 | 3/2014 | Edwards et al. |
| 2014/0112130 | A1 | 4/2014 | Yang et al. |
| 2014/0115706 | A1 | 4/2014 | Silva et al. |
| 2014/0129700 | A1 | 5/2014 | Mehta |
| 2014/0153572 | A1 | 6/2014 | Hampel |
| 2014/0160939 | A1 | 6/2014 | Arad |
| 2014/0226467 | A1 | 8/2014 | Park |
| 2014/0241345 | A1 * | 8/2014 | DeCusatis ............... H04L 49/25 370/355 |
| 2014/0245387 | A1 | 8/2014 | Colpo |
| 2014/0280834 | A1 * | 9/2014 | Medved ............... H04L 47/122 709/223 |
| 2014/0325038 | A1 | 10/2014 | Kis |
| 2014/0325649 | A1 | 10/2014 | Zhang |
| 2014/0371941 | A1 | 12/2014 | Keller et al. |
| 2014/0376406 | A1 | 12/2014 | Kim |
| 2015/0081762 | A1 | 3/2015 | Mason et al. |
| 2015/0112933 | A1 | 4/2015 | Satapathy |
| 2015/0195190 | A1 | 7/2015 | Shah Heydari |
| 2015/0312658 | A1 | 10/2015 | Winzer |
| 2015/0363522 | A1 | 12/2015 | Maurya |
| 2016/0043996 | A1 | 2/2016 | Syed Mohamed |
| 2016/0119299 | A1 | 4/2016 | Amulothu |
| 2016/0142427 | A1 | 5/2016 | de los Reyes |
| 2016/0165454 | A1 | 6/2016 | Li |
| 2016/0330076 | A1 | 11/2016 | Tiwari |
| 2016/0337247 | A1 | 11/2016 | Yao |
| 2016/0344592 | A1 | 11/2016 | Cook |
| 2017/0026225 | A1 | 1/2017 | Smith |
| 2017/0026226 | A1 | 1/2017 | Grussling |
| 2017/0026243 | A1 | 1/2017 | Bemer |
| 2017/0026252 | A1 | 1/2017 | Dearien |
| 2017/0026276 | A1 | 1/2017 | Dearien |
| 2017/0026291 | A1 | 1/2017 | Smith |
| 2017/0026292 | A1 | 1/2017 | Smith |
| 2017/0026349 | A1 | 1/2017 | Smith |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

PCT/US2016/038139 Patent Cooperation Treaty, International Search Report and Written Opinion of the International Searching Authority, dated Sep. 9, 2016.

PCT/US2016/038419 Patent Cooperation Treaty, International Search Report and Written Opinion of the International Searching Authority, dated Aug. 30, 2016.

PCT/US2016/039582 Patent Cooperation Treaty, International Search Report and Written Opinion of the International Searching Authority, Feb. 8, 2017.

PCT/US2016/039081 Patent Cooperation Treaty, International Search Report and Written Opinion of the International Searching Authority, dated Sep. 8, 2016.

PCT/US2016/039079 Patent Cooperation Treaty, International Search Report and Written Opinion of the International Searching Authority, dated Oct. 12, 2016.

* cited by examiner

CONFIGURATION OF A SOFTWARE DEFINED NETWORK

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for aiding in the configuration of a software defined network ("SDN"). More specifically, but not exclusively, the present disclosure pertains to systems in which a network may operate in an open mode in which devices are allowed to communicate so that flows among devices may be identified.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information utilized for the proper assessment of power system conditions and for implementing control actions based on such conditions. Such messages may be subject to time constraints because of the potential for rapid changes in conditions in an electric power transmission and distribution system. In other words, if the messages are delayed, the data in the messages may no longer be accurate or useful to a receiving device.

Some electric power transmission and distribution systems may incorporate software defined network ("SDN") technologies that utilize a controller to configure and monitor on the network. SDN technologies offer a variety of features that may be advantageous in electric power systems (e.g., a deny-by-default security policy, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific traffic flows through the communication network. A traffic flow, as the term is used herein, refers to a set of parameters used to match and take action based on network packet contents. Traffic flows may permit specific paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting the forwarding tables in the devices. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a selected traffic flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Configuration of an SDN may be challenging because each communication flow between hosts must be configured or the traffic between the hosts may be blocked due to the deny-by-default security policy employed in SDN networks. In order to facilitate the confirmation of certain aspects of an SDN, the inventors of the present disclosure have recognized that communication paths may be discovered by allowing an SDN to operate in an open mode for a period of time. In the open mode, the deny-by-default security policy may be replaced by an allow-by-default policy. As a result, all traffic in the network may be forwarded to its destination without regard to whether a specific communication flow enables the communications. In various embodiments, a number of communication protocols and technologies may be utilized to enable the network to automatically discover communication paths between communicating hosts. For example, a routing information protocol ("RIP"), an open shortest path first ("OSPF") protocol, a spanning tree protocol ("STP"), and the like may allow for the routing of information in a network without requiring a user to specify the details of data routing paths in the network.

After the communication paths have been identified in the open mode, the paths may be analyzed to identify a plurality of communication flows to be implemented to enable communication among various communication hosts in the network by an SDN controller. In some embodiments, the plurality of identified communication flows may be confirmed by a user prior to the creation of the communication flow. Such confirmation may allow the user to retain control over the flow of information within the network while benefiting from the automated identification of a plurality of communication flows within the SDN. After the discovered communication paths are implemented as communication flows, the SDN may be transitioned from the open mode to an operating mode. In the operating mode, the deny-by-default security policy that is typically utilized in an SDN may be enforced, and the flow of traffic in the SDN may be controlled by the communication flows established by the SDN controller.

The systems and methods disclosed herein may also be of use in troubleshooting the operation of an SDN. In one specific example, a method may "single-step" one or more packets to see where the packet stops if a communication flow is not making it from source to destination. Such a method may allow an operator to identify the specific communication flow operations resulting in the undesirable behavior on the network.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 1:
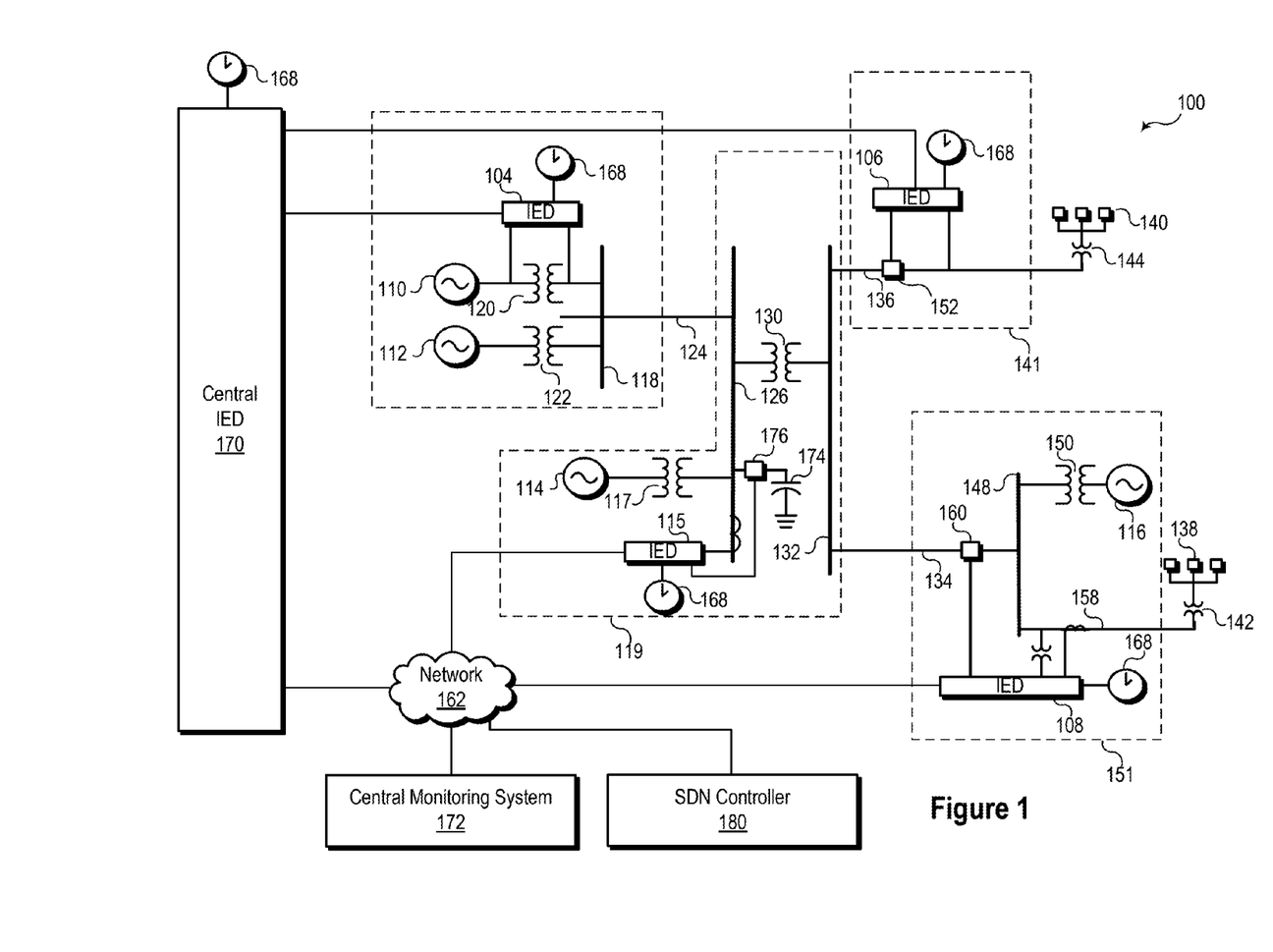
FIG. 1 illustrates a simplified one-line diagram of an electric power transmission and distribution system in which a plurality of communication devices may facilitate communication in a software defined network consistent with embodiments of the present disclosure.

FIG. 1 illustrates a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

In various embodiments, controller 180 may include a traffic routing system configured to automatically generate specific communication paths created based on user-specified traffic flows within system 100. For example, a user-specified traffic flow may indicate that IED 115 provides data to IED 108. Based on the user-specified traffic flow between IED 115 and IED 108, the traffic routing system may identify and configure a plurality of intermedia devices (e.g., switches, physical communication links, etc.) to implement a specific communication path through network 162. Automating the creation of specific communication paths based on high-level traffic flows may reduce the configuration burden imposed on operators of system 100.

Configuration of network 162 may be challenging because each communication flow between hosts must be configured or the traffic between the hosts may be blocked. For example, IED 108 may require information from IED 115 to carry out its monitoring and protection functions, and as such, IED 115 may need to provide a stream of data to IED 108 relating to electrical parameters monitored by IED 115. In a typical SDN, a network engineer or other user would therefore need to create a communication flow between IED 115 and IED 108. In the event that this communication flow is overlooked or implemented incorrectly, the data from IED 115 may be blocked from reaching IED 108. During commissioning or troubleshooting of system 100, network 162 may be operated in an open mode.

In the open mode, communications in network 162 may be allowed-by-default. In other words, traffic may not be blocked by the absence of a specific communication flow or due to security restrictions. In the open mode, a variety of communication protocols may be utilized to discover communication paths and network topology between devices in network 162. For example, a routing information protocol ("RIP"), an open shortest path first ("OSPF") protocol, a spanning tree protocol ("STP"), address resolution protocol ("ARP"), ping, passive discovery, and the like may allow for the routing of information in a network without requiring a user to specify the details of data routing paths in the network. The flows of data across the communication paths may be monitored and analyzed to determine a plurality of communication flows within the network 162. The SDN controller 180 may be configured to receive information relating to the flows of data and may be configured to identify and create communication flows in network 162 when the network is returned to an operating mode. In the operating mode, a deny-by-default security policy may be implemented, and accordingly, traffic that is not specifically allowed by an established communication flow may be blocked.

After the communication paths have been discovered in the open mode, the paths may be analyzed to identify a plurality of communication flows to be implemented to enable communication among various communication hosts in the network by an SDN controller. In some embodiments, the plurality of identified communication flows may be confirmed by a user prior to the creation of the communication flow. Such confirmation may allow the user to retain control over the flow of information within the network while benefiting from the automated identification of a plurality of communication flows within the SDN. After the discovered communication paths are implemented as communication flows, the SDN may be transitioned from the open mode to an operating mode. In the operating mode, the deny-by-default security policy that is typically utilized in an SDN may be enforced, and the flow of traffic in the SDN may be controlled by the communication flows established by the SDN controller.

Figure 2:
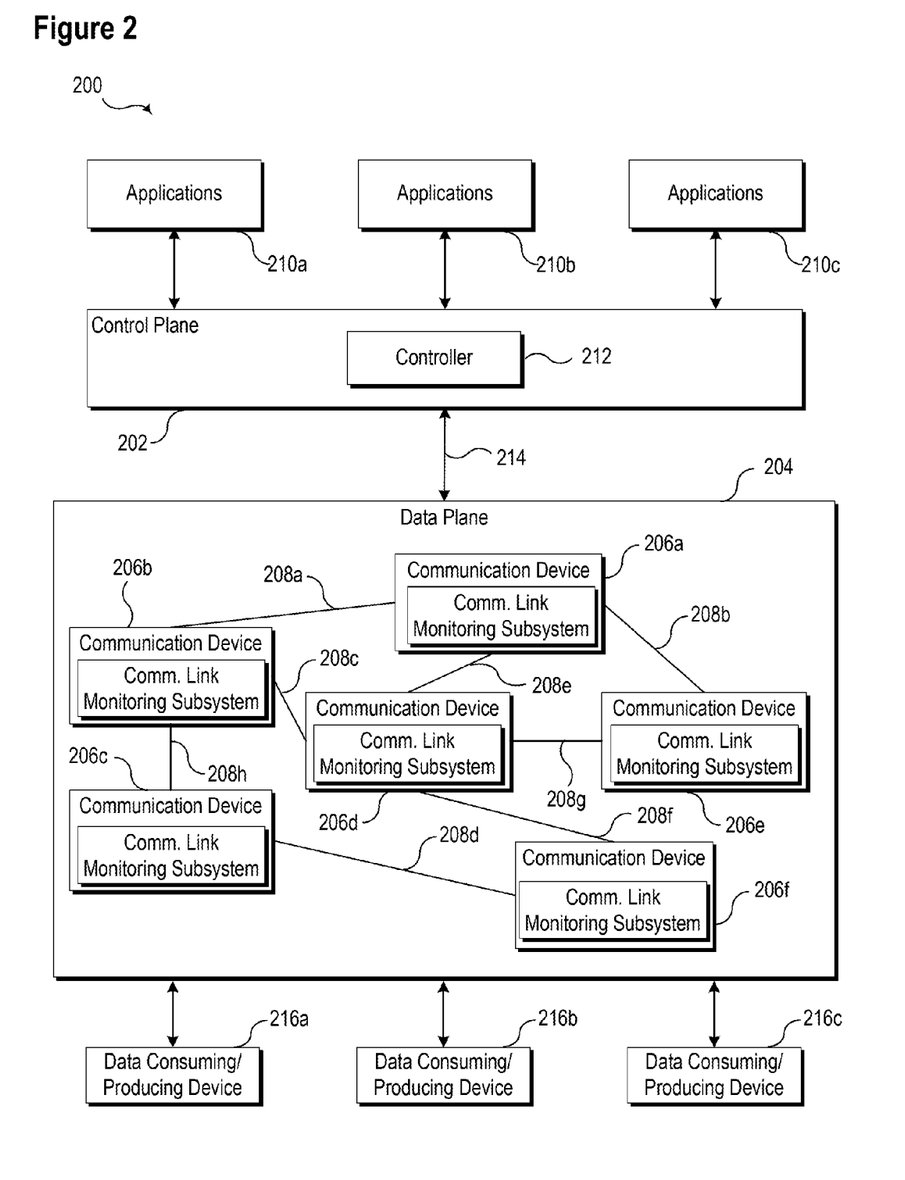
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 210a-210c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish traffic flows. The controller may specify rules for routing traffic through the data plane 204 based on a variety of criteria.

As illustrated, the data plane 204 includes a plurality of communication devices 206a-206f in communication with one another via a plurality of physical communication links 208a-208h. In various embodiments, the communication devices 206a-206f may be embodied as switches, routers, multiplexers, and other types of communication devices. The physical communication links 208a-208h may be embodied as Ethernet, fiber optic, and other forms of data communication channels. As illustrated, the physical communication links 208a-208h between the communication devices 206a-206f may provide redundant connections such that a failure of one of the physical communication links 208a-208h is incapable of completely blocking communication with an affected communication device. In some embodiments, the physical communication links 208a-208h may provide an N-1 redundancy or better.

The plurality of applications 210a-210c may represent a variety of applications 210a-210c operating in an applications plane. In the SDN architecture illustrated in FIG. 2, controller 212 may expose an application programming interface (API) that services 210a-210c can use to configure the data plane 204. In this scenario, controller 212 may act as an interface to the data plane 204 while the control logic resides in the applications 210a-210c. The configuration of controller 212 and applications 210a-210c may be tailored to meet a wide variety of specific needs.

The data consuming/producing devices 216a-216c may represent a variety of devices within an electric power transmission and distribution system that produce or consume data. For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be forwarded through the data plane 204 using a plurality of traffic flows implemented by controller 212. Of course, data consuming/producing devices 216a-216c may be embodied by a wide range of devices consistent with embodiments of the present disclosure.

The plurality of communication devices 206a-206f may each include a communication link monitoring system that may monitor a variety of types of information relating to data flowing through the communication device. For example, when the network is operated in an open mode, the communication link monitoring subsystems may be configured to collect information about the routing of data, counters of the number of data packets transmitted through a variety of communication paths, latency statistics, and the like. Such statistical and routing information may be communicated to controller 212 and utilized to identify communication flows between communicating hosts that should be implemented when the network is returned to an operating mode.

Figure 3:
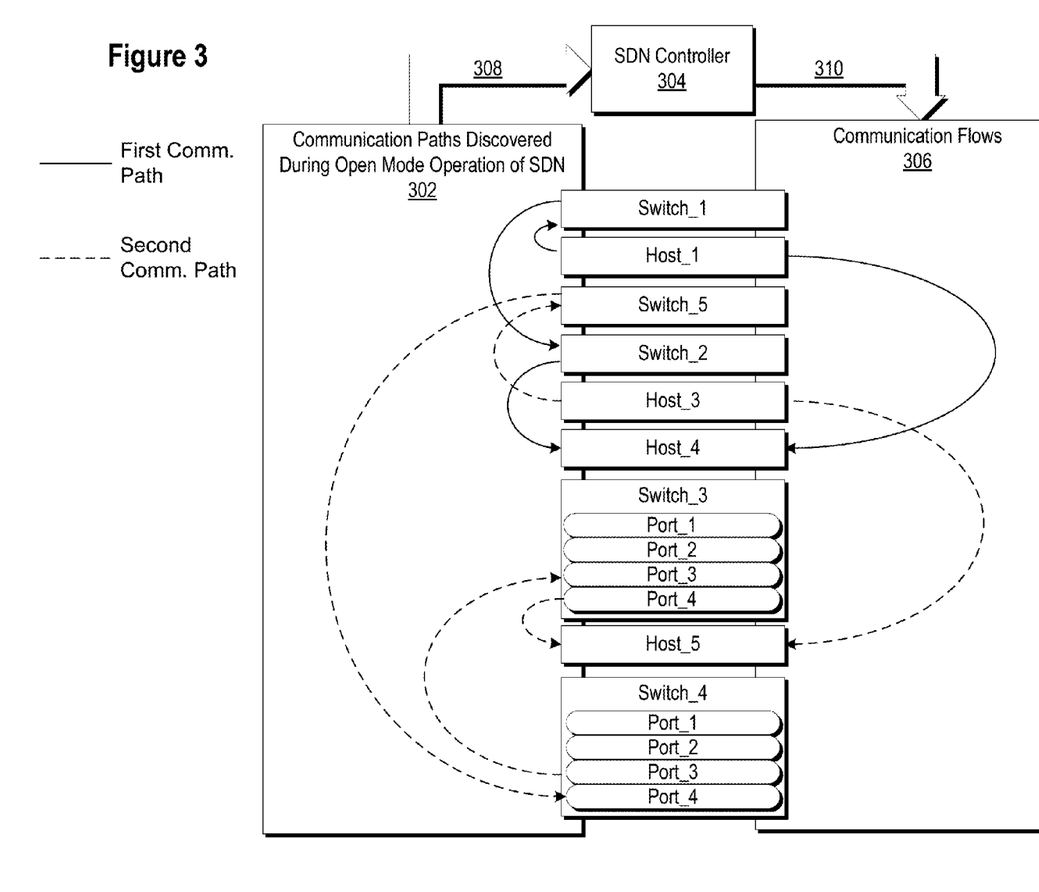
FIG. 3 illustrates a conceptual representation of a plurality of communication paths discovered while an SDN is operating in an open mode and a plurality of communication flows created by an SDN controller consistent with embodiments of the present disclosure.

FIG. 3 illustrates a conceptual representation of a plurality of communication paths 302 discovered while an SDN is operating in an open mode and a plurality of communication flows 306 created by an SDN controller 304 consistent with embodiments of the present disclosure. In the open mode, all traffic in the network may be forwarded to its destination without regard to whether a specific communication flow enables the communications and without user intervention. In the illustrated embodiment, Host_1 communicates with Host_4 through a first communication path, and Host_3 communicates with Host_5. A data packet created by Host_1 may be forwarded to Host_4. In the first communication path, the data packet created by Host_1 may be transmitted to Switch_1, from Switch_1 the packet is transmitted to Switch_2, and the data packet is transmitted from Switch_2 to Host_4. In the second communication path, a data packet created by Host_3 is transmitted to Switch_5, the packet is then transmitted from Switch_5 to Switch_4 (port 4), the packet is then transmitted from Switch_4 (port 3) to Switch_3 (Port 3), the packet is then transmitted from Switch_3 (port 4) to Host_5. Although the traffic flows are illustrated using unidirectional arrows, the traffic flows may be bi-directional.

During operation of the SDN in the open mode, routing information and statistics associated with the communication paths may be collected and provided to SDN controller 304, as indicated by arrow 308. SDN controller 304 may analyze the information to identify a plurality of communication flows 306 to be created as indicated by arrow 310. Based on the analysis, the communication flows 306 between Host_1 and Host_4 and between Host_3 and Host_5 may be created. The communication flows 306 are not necessarily limited to the specific communication paths 302 discovered during the open mode of operation. When the SDN is in operation, the specific communication of switches used to connect communicating hosts may be adjusted by the SDN controller 304 as needed to account for a variety of conditions (e.g., link failures, network congestion, prioritization, etc.).

Figure 4:
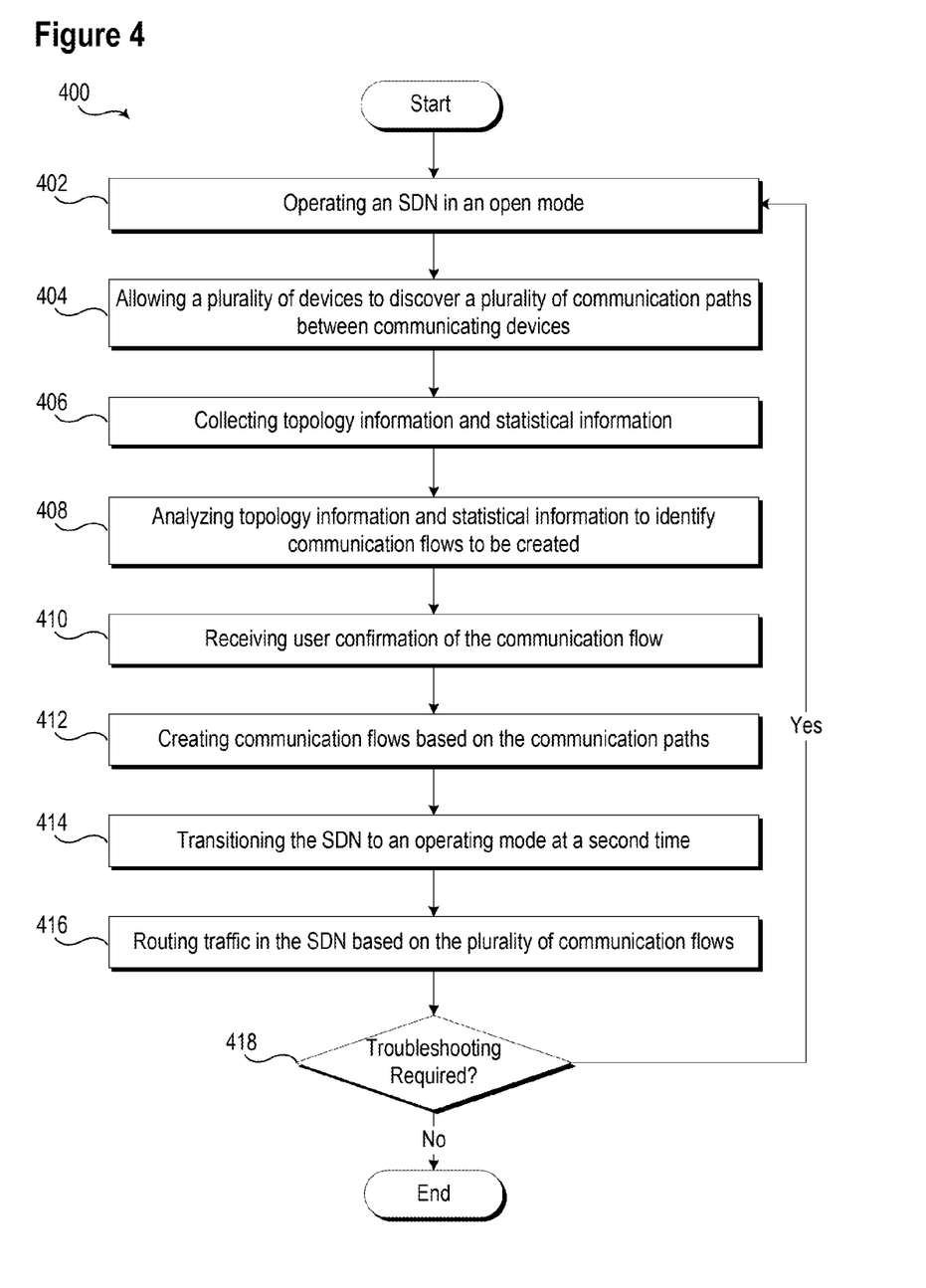
FIG. 4 illustrates a flow chart of a method for configuring a software defined network consistent with embodiments of the present disclosure.

FIG. 4 illustrates a flow chart of a method 400 for configuring a software defined network consistent with embodiments of the present disclosure. At 402, an SDN may be operated in an open mode. In the open mode, the deny-by-default security policy may be replaced by an allow-by-default policy. As a result, all traffic in the network may be forwarded to its destination without regard to whether a specific communication flow enables the communications. At 404, the plurality of devices may be allowed to discover a plurality of communication paths between communication devices based on traffic forwarded through the network.

At 406, routing information and statistical information may be collected about topology and statistical information regarding data transmitted through the network. In some embodiments, the path of data through the network and information about the data may be collected. The information may be analyzed to identify communication flows to be created at 408. In some embodiments, thresholds may be established to determine which of the plurality of communication paths should be the basis for creation of communication flows. For example, a threshold may be established that limits the amount of flows that can be setup before the system transitions between the open state to the closed state.

In some embodiments, user confirmation may be obtained before establishing communication flows. In such embodiments, user confirmation may be received at 410. Allowing a user to specifically confirm each communication flow may allow the user to retain significant control over the routing of traffic in the SDN, while still reducing the configuration burden associated with identifying and configuring each communication flow. The communication flows identified by the analysis may be created at 412.

After the appropriate communication flows are created, the SDN may be transitioned to an SDN operating mode at 414, and the routing of traffic in the SDN may be based on the plurality of communication flows. At 418, method 400 may determine whether trouble shooting is necessary, and if so, method 400 may return to 402. In some circumstances, an operator of an SDN may need to troubleshoot issues caused by communications being blocked that should be allowed. As such, the operator of the network may transition the SDN to the open mode to aid in identifying the traffic that was not reaching its destination. As the flow of data in the open mode is analyzed, the data that was being blocked may be identified as a new communication flow and implemented by an SDN controller when the SDN is returned to the operating mode. In some embodiments, a system implementing method 400 may be configured to specifically identify traffic identified in the open mode that does not correspond to data flows created at 412.

Figure 5:
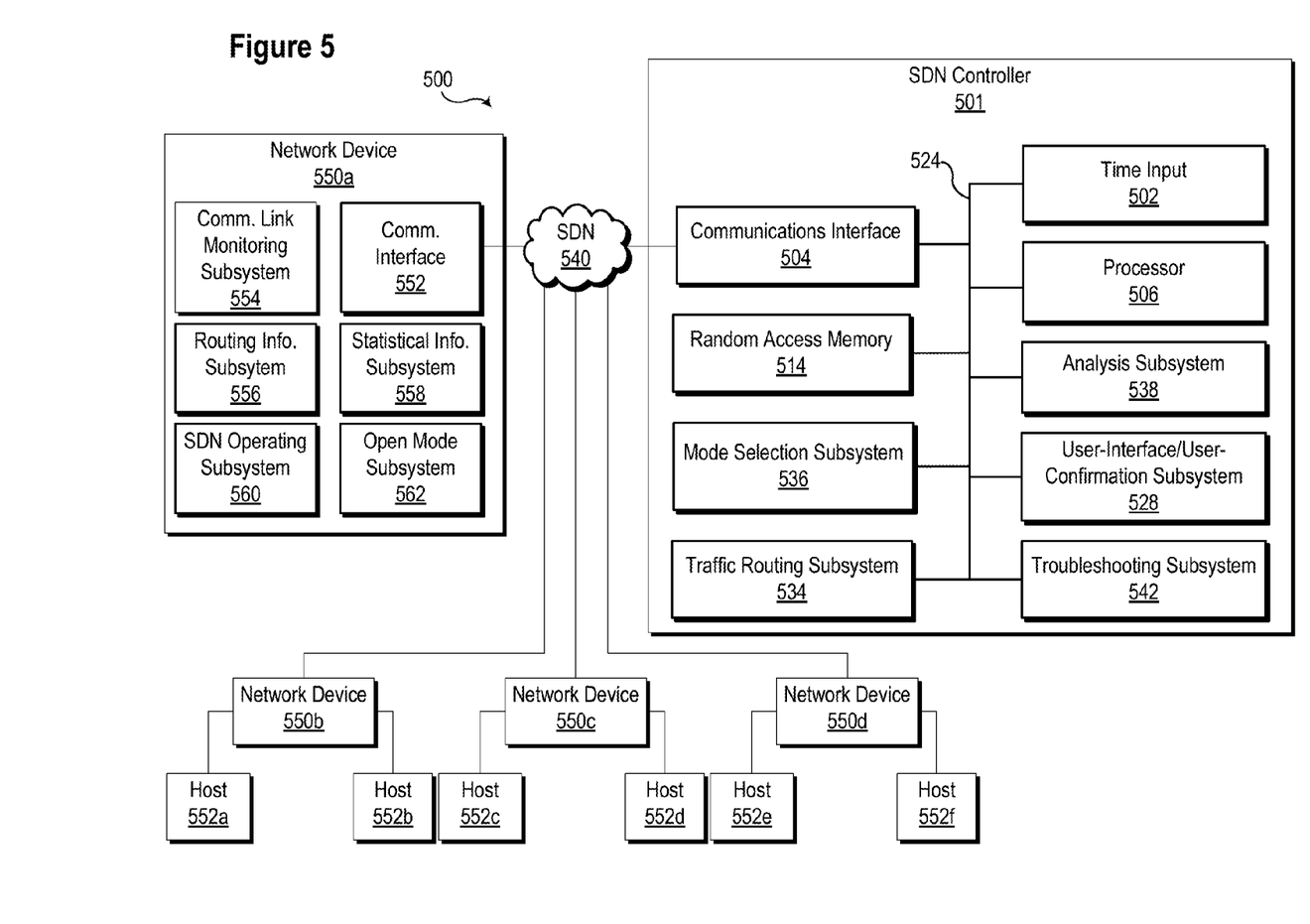
FIG. 5 illustrates a block diagram of a system including an SDN controller, an SDN, and a plurality of network devices consistent with embodiments of the present disclosure.

FIG. 5 illustrates a block diagram of a system 500 including an SDN controller 501, an SDN 540, and a plurality of network devices 550a-d consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

SDN controller 501 includes a communications interface 504 configured to communicate with SDN 540 and network devices 550a-d. Communications interface 504 may facilitate communications with multiple devices. SDN Controller 501 may further include a time input 502, which may be used to receive a time signal (e.g., a common time reference) allowing SDN controller 501 to apply a time-stamp received data. In certain embodiments, a common time reference may be received via communications interface 504, and accordingly, a separate time input may not be required. One such embodiment may employ the IEEE 1588 protocol. A data bus 524 may facilitate communication among various components of SDN controller 501.

Processor 506 may be configured to process communications received via communications interface 504 and time input 508 and to coordinate the operation of the other components of SDN Controller 501. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of traffic flows.

A user-interface subsystem 528 may be configured to receive from a user various types of information relating to configuring SDN 540. In some embodiments, the user-interface subsystem may be configured to confirm the creation of communication flows in SDN 540. The communication flows to be confirmed may be identified by SDN controller 501 during operation of SDN 540 in an open mode. The user-interface subsystem 528 may further be configured to allow a user to transition the SDN 540 between operation in an open mode and an operating mode.

A mode selection subsystem 536 may be configured to permit system 500 to transition between an open mode and an SDN operating mode. In the open mode, devices in system 500 may be permitted to freely communicate. In other words, traffic among devices in system 500 may not be blocked or restricted by the absence of a specific communication flow or due to security restrictions. In the open mode, a variety of communication protocols may be utilized to discover communication paths between devices in system 500. For example, a routing information protocol ("RIP"), an open shortest path first ("OSPF") protocol, a spanning tree protocol ("STP"), and the like may allow for the routing of information in a network without requiring a user to specify the details of data routing paths in the network. One of skill in the art will recognize that other protocols may be utilized to forward traffic within system 500 without requiring a user to specify the details of data routing in the open mode. In contrast, in the SDN operating mode, when system 500 is operating in the operating mode, a deny-by-default security policy may be implemented, and accordingly, traffic that is not specifically allowed by an established communication flow may be blocked. A variety of other features offered by SDN 540 may also be enabled.

An analysis subsystem 538 may be configured to analyze data relating to traffic transmitted via SDN 540. The data transmitted across SDN 540, network devices 550*a-d* and hosts 552*a*-552*f* in an open mode may be monitored and analyzed to identify a plurality of communication flows within the network 162. In various embodiments, network devices 550*a-d* may collect information about the data transmitted across SDN 540. The data collected by network devices 550*a-d* relating to traffic on the network may be provided to analysis subsystem 538.

Traffic routing subsystem 534 may be configured to generate a variety of communication flows in SDN 540 based on information received from the analysis subsystem 538 and/or the user interface module. The traffic routing subsystem 534 may specify the configuration of a variety of intermediate devices (e.g., routers, switches, multiplexers, etc.), separating communicating hosts. The traffic routing subsystem 534 may be configured to generate physically distinct paths for traffic flows among devices in system 500. For example, host 552*f* may provide a stream of data to host 552*a*. A communication flow corresponding to the stream of data may include a path from host 552*f* to network device 550*d*, from network device 550*d* to network device 550*b*, and from network device 550*b* to Host 552*a*.

A trouble shooting subsystem 542 may be configured to aid in identifying configuration problems in system 500 and identifying possible solutions. In one specific example, an operator of an SDN may need to troubleshoot issues caused by communications being blocked that should be allowed. The operator of the network may transition the SDN to the open mode after an initial commissioning has occurred. In the open mode, the traffic that was not reaching its destination may be allowed to reach its destination, and as such, a communication path may be discovered. As the flow of data in the open mode is analyzed, the data that was being blocked may be identified. In some embodiments, analysis subsystem 538 may be configured to specifically identify a communication path identified in the open mode that does not correspond to existing data flows. In this way, a user may be able to more easily identify the need for creation of additional communication flows to enable the previously blocked traffic.

Network device 550*a* is illustrated in greater detail than the other network devices 550*b-c*, however, network devices 550*b*-550*d* may include some or all of the same features and elements. In the open mode, communication among communication hosts 552*a-f* may be permitted without regard for whether a specific communication flow has been established to allow the traffic. Each of the network devices 550-*d* may include a communication interface 552, a communication link monitoring subsystem 554, a routing information subsystem 556, a statistical information subsystem 558, an SDN operating subsystem 560, and an open mode subsystem 562. The communication interface 552 may facilitate communications with multiple devices. In various embodiments, the communication interface 552 may be configured to communicate via a variety of communication links, including Ethernet, fiber optic, and other forms of data communication channels.

The communication link monitoring subsystem 554 may be configured to monitor communications received or transmitted by network device 550*a*. In some embodiments, the communication link monitoring subsystem 554 may be determine a deviation from normal parameters, to monitor packet loss, to monitor latency, and to monitor other metrics relating to data transmission. The communication link monitoring subsystem 554 may be configured to determine whether communication links are stable and reliable and/or to determine if data traffic should be forwarded to avoid unstable or unreliable communication links.

The routing information subsystem 556 may be configured to track the connection of devices and routing of data through network device 550*a*. In some embodiments, the routing information subsystem may include a routing table, a routing information base, a forwarding table, etc. The routing information subsystem 556 may be configured to provide information to analysis subsystem 538 about data transmitted by network device 550*a* that may be utilized by analysis subsystem 538 to identify communication flows involving network device 550*a*.

The statistical information subsystem 558 may be configured to collect statistics relating to data passing through network device 550*a*. In some embodiments, such statistics may include a variety of types of information, including packet counts, errors, drops, or overruns, etc. The statistical information subsystem 558 may be configured to provide information to analysis subsystem 538 about data transmitted by network device 550*a* that may be utilized by analysis subsystem 538 to identify communication flows involving network device 550*a*.

The SDN operating subsystem 560 may be configured to allow network devices to operate in an SDN operating mode. The SDN operating subsystem 560 may be configured to interact with SDN controller 501 to receive configuration instructions relating to operation in the SDN operating mode. Further, SDN operating subsystem 560 may be configured to allow network device 550*a* to implement various features and functionality utilized by SDN 540. Such features may include processing and routing of data based on communication flows established by SDN controller 501 and implementation of a deny-by-default security policy.

The open mode subsystem 562 may enable network device 550*a* to utilize a variety of protocols relating to the transmission of data to various destinations without requiring that a user specify the details of data routing. The open mode subsystem 562 may be configured to allow network device 550*a* to forward traffic without relying on communication flows and based on an allow-by-default security policy.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system operable to configure a software defined network (SDN), the system comprising:
    a first communication host;
    a second communication host;
    a network in communication with the first communication host and the second communication host, the network comprising a plurality of network devices, the plurality of network devices configured to:
        selectively operate in each of an open mode and an SDN operating mode; and
        identify a discovered path between the first communication host and the second communication host to forward data through the network in the open mode,
    wherein the plurality of network devices are configured to implement an allow-by-default communication security policy using at least one automated communication protocol in the open mode;
an SDN controller in communication with the network, the SDN controller comprising:
a mode selection subsystem configured to cause the plurality of network devices to transition between the open mode and the SDN operating mode;
an analysis subsystem configured to identify a communication flow corresponding to the discovered path between the first communication host and the second communication host; and
a traffic routing subsystem configured to create a communication flow corresponding to the discovered path, the communication flow operable to allow communication between the first communication host and the second communication host in the SDN operating mode;
wherein the plurality of network devices are configured to implement a deny-by-default communication security policy in the SDN operating mode.

2. The system of claim 1, wherein the SDN controller further comprises a user confirmation subsystem configured to receive user confirmation of the communication flow.

3. The system of claim 1, wherein the plurality of network devices are operable to identify the discovered path between the first communication host and the second communication host without user intervention.

4. The system of claim 3, wherein each of the plurality of network devices are configured to communicate using a plurality of automated protocols in the open mode.

5. The system of claim 4, wherein the plurality of automated protocols comprise at least one of a routing information protocol, an open shortest path first protocol, a spanning tree protocol, address resolution protocol, ping, and passive monitoring.

6. The system of claim 1, wherein each of the plurality of network devices are configured to collect topology information and statistical information relating to the discovered path.

7. The system of claim 6, wherein the analysis subsystem is further configured to analyze the topology information and statistical information to identify the path between the first communication host and the second communication host.

8. A method of configuring a software defined network (SDN), comprising:
operating the SDN in an open mode at a first time;
identifying a plurality of communication paths between a plurality of communicating hosts using a plurality of network devices, the plurality of communicating hosts including a first communication host and a second communication host, and the plurality of communication paths comprising a discovered path between the first communication host and the second communication host, wherein the plurality of network devices are configured to implement an allow-by-default communication security policy using at least one automated communication protocol in the open mode;
creating a plurality of communication flows using an SDN controller based on at least a subset of the plurality of communication paths, the plurality of communication flows comprising a communication flow corresponding to the discovered path between the first communication host and the second communication host;
transitioning the SDN to an SDN operating mode at a second time, wherein the plurality of network devices are configured to implement a deny-by-default communication security policy in the SDN operating mode; and
routing traffic in the SDN between the first communication host and the second communication host based on the plurality of communication flows.

9. The method of claim 8, further comprising receiving user confirmation of the communication flow prior to allowing traffic between the first communication host and the second communication host based on the communication flow.

10. The method of claim 8, wherein the plurality of communication paths between communicating devices are identified without user intervention.

11. The method of claim 8, further comprising:
communicating the path between the first communication host and the second communication host discovered while the SDN is operating in the open mode to an SDN controller, and wherein the SDN controller creates the communication flow corresponding to the path between the first communication host and the second communication host.

12. The method of claim 11, wherein communicating the path between the first communication host and the second communication host created while the SDN is operating in the open mode comprises:
transmitting topology information and statistical information relating to the plurality of communication paths from the plurality of devices to the SDN controller;
analyzing topology information and statistical information to identify the path between the first communication host and the second communication host.

13. A system operable to configure a communication flow between a first communication host and a second communication host in a software defined network (SDN), the system comprising:
a mode selection subsystem configured to cause a plurality of network devices in a network connecting the first communication host and the second communication host to transition between an open mode and an SDN operating mode, wherein the plurality of network devices are configured to discover a path between the first communication host and the second communication host in the open mode, wherein the plurality of network devices are configured to implement an allow-by-default communication security policy using at least one automated communication protocol in the open mode;
an analysis subsystem configured to receive information from the plurality of network devices about the discovered path between the first communication host and the second communication host; and
a topology subsystem configured to create a communication flow corresponding to the discovered path between the first communication host and the second communication host, the communication flow operable to allow communication between the first communication host and the second communication host in the SDN operating mode, wherein the plurality of network devices are configured to implement a deny-by-default communication security policy in the SDN operating mode.

14. The system of claim 13, wherein the system further comprises a user confirmation subsystem configured to receive user confirmation of the communication flow.

15. The system of claim 13, wherein each of the plurality of network devices are operable to identify the discovered path between the first communication host and the second communication host without user intervention.

16. The system of claim 13, wherein each of the plurality of network devices are configured to communicate using a plurality of automated topology discovery protocols in the open mode.

17. The system of claim 16, wherein the automated routing protocols comprise at least one of a routing information protocol, an open shortest path first protocol, a spanning tree protocol, address resolution protocol, ping, and passive monitoring.

* * * * *